No. 715,866. Patented Dec. 16, 1902.
G. A. RENTSCHLER & J. KAEFER.
FURNITURE CASTER.
(Application filed Sept. 20, 1902.)

(No Model.)

Witnesses:
Elmer R. Shipley
M. S. Belden.

George A. Rentschler
John Kaefer
Inventors
by James W. See
Attorney

THE NORRIS PETERS CO., PHOTO-LITHO., WASHINGTON, D. C.

UNITED STATES PATENT OFFICE.

GEORG A. RENTSCHLER AND JOHN KAEFER, OF HAMILTON, OHIO, ASSIGNORS TO THE PHOENIX CASTER COMPANY, OF INDIANAPOLIS, INDIANA.

FURNITURE-CASTER.

SPECIFICATION forming part of Letters Patent No. 715,866, dated December 16, 1902.

Application filed September 20, 1902. Serial No. 124,153. (No model.)

*To all whom it may concern:*

Be it known that we, GEORG A. RENTSCHLER and JOHN KAEFER, citizens of the United States, residing at Hamilton, Butler county, Ohio, have invented certain new and useful Improvements in Furniture-Casters, (Case C,) of which the following is a specification.

This invention, pertaining to improvements in two-wheeled furniture-casters, will be readily understood from the following description, taken in connection with the accompanying drawings, in which—

Figure 1:
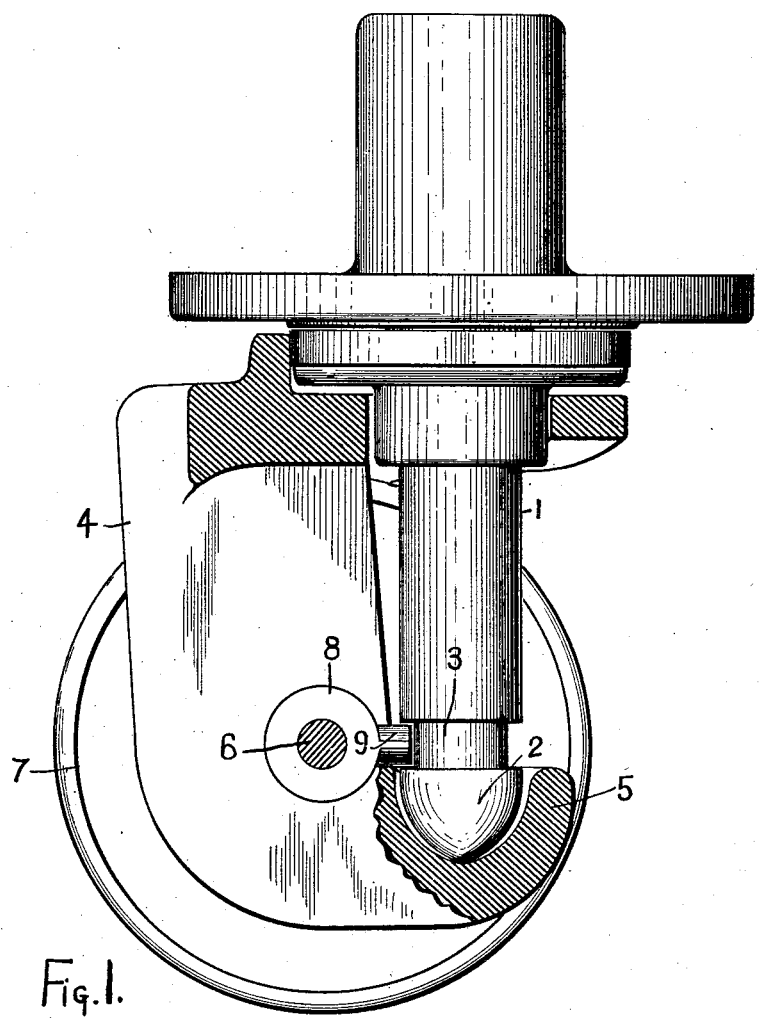
Figure 2:
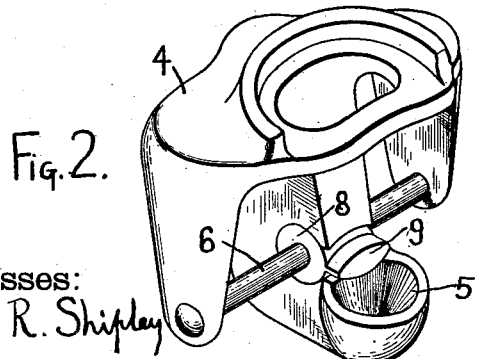

Figure 1 is a vertical section in a plane transverse to the axle of our improved caster, and Fig. 2 is a perspective view of the housing.

In the drawings, 1 indicates the stem of the caster to be fitted for attachment to furniture in any usual manner; 2, its rounded lower end to form the pivot for the swiveling and oscillating motion of the housing; 3, a circumferential groove formed near the lower end of the stem; 4, the housing; 5, a cup projecting forwardly from the central horn of the housing and engaging the rounded lower end of the stem; 6, the wheel-axle, disposed across the housing to the rear of the stem and in the horizontal plane of groove 3 therein; 7, the floor-wheels mounted on the axle; 8, a bushing surrounding the axle where it passes through the central horn of the housing, this bushing separably fitting the axle and the aperture in the central horn of the housing, and 9 a lug projecting forwardly from the bushing 8 through a gap leading outwardly from the housing-aperture containing the bushing, this lug projecting into groove 3 of the stem.

The lug 9 prevents the displacement of the housing from the stem, while permitting free swiveling and oscillating motion. In assembling the parts the housing is placed upon the stem, the bushing placed in its opening in the housing with its lug engaging the groove of the stem, the wheels inserted, and the axle put in place and riveted, as usual.

We claim as our invention—

In a furniture-caster, the combination, substantially as set forth, of a stem adapted for attachment to furniture and having a rounded lower end and provided with a circumferential groove near its lower end, a housing having a central horn provided with an axle-aperture larger than the axle and with a forwardly-projecting cup to engage the lower end of the stem, a bushing seated in said aperture in the horn of the housing to the rear of the stem, a lug projecting forwardly from the bushing and engaging the groove in the stem, an axle engaging the bushing, and floor-wheels mounted on the axle.

GEORG A. RENTSCHLER.
JOHN KAEFER.

Witnesses:
ELMER Q. SHIPLEY,
M. S. BELDEN.